Oct. 15, 1935.  J. WOODLEY  2,017,560
COMBINATION FOOD AND LIQUID JUG
Filed Dec. 7, 1931
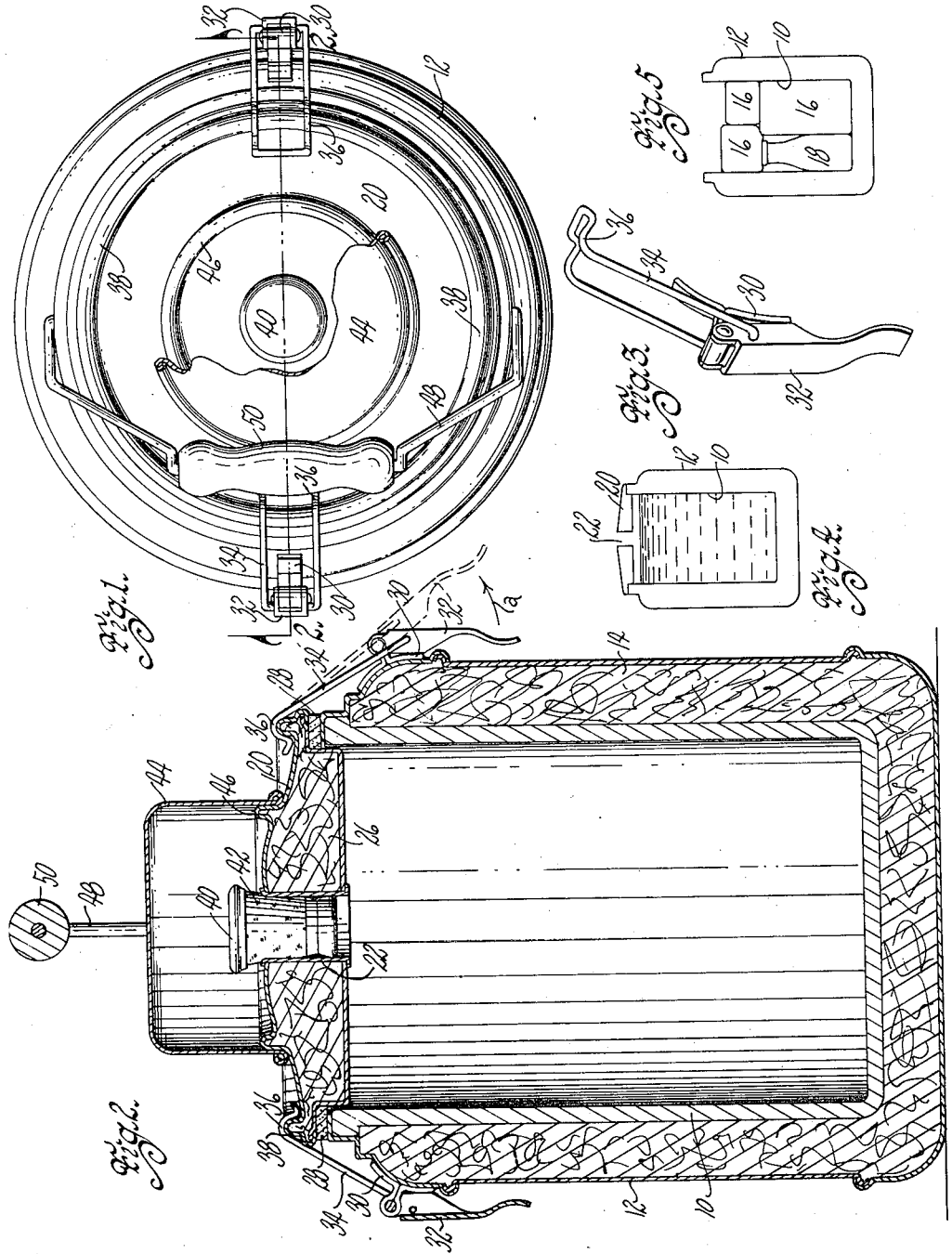
Inventor
Joseph Woodley
By Bair, Freeman & Sinclair
Attorneys
Witness
Edw. Seeley Patented Oct. 15, 1935

2,017,560

UNITED STATES PATENT OFFICE 2,017,560

COMBINATION FOOD AND LIQUID JUG

Joseph Woodley, Belleville, Ill., assignor to Knapp-Monarch Company, Belleville, Ill., a corporation of Missouri Application December 7, 1931, Serial No. 579,356

3 Claims. (Cl. 215—13)

The object of my invention is to provide a combination food and liquid jug which is simple, durable and comparatively inexpensive to manufacture.

Still a further object is to provide a jug construction which can be used for containing either food or liquid, such jug being preferably of insulated construction. The use for such a jug is quite obvious. There are different types of liquid jugs which are very handy for tourists, especially to contain liquid such as drinking water or coffee for picnics or the like and especially when these are of insulated character they can keep the contents in either a cold or hot state for a considerable period of time. It is also obvious that such a jug would be desirable if food could be carried in it which would be kept hot or cold in the same way. The objection to the ordinary jug is that the mouth is too small to insert and remove food relative to the jug conveniently and I have, accordingly, provided a combination jug which can be uncovered for inserting or removing food from the jug or covered when the jug is to be used as a liquid container, means being provided for pouring out the liquid as desired.

More particularly, it is my object to provide a jug construction comprising a container having a wide mouth and a cover for the container which is readily removable therefrom, the cover having a liquid outlet opening which may be closed with a cork or other closure means.

Still a further object is to provide an insulated jug which can be used for carrying food, the jug having a wide mouth for this purpose and which can also be used for liquid, the cover for the jug being liquid tight when placed on the jug and having an outlet for pouring the liquid from the jug.

With these and other objects in view my invention consists in the construction, arrangement and combination of the various parts of my combination food and liquid jug, whereby the objects contemplated are attained, as hereinafter more fully set forth, pointed out in my claims, and illustrated in the accompanying drawing, in which:

Figure 1 is a plan view showing my combined food and liquid jug.

Figure 2 is a vertical sectional view on the line 2—2 of Figure 1.

Figure 3 is a perspective view of a fastening device for the cover of the jug; and Figures 4 and 5 are diagrammatic views showing the jug used as a liquid container and a food container, respectively.

On the accompanying drawing, I have used the reference numeral 10 to indicate a container adapted for containing food and/or liquid. The container 10 may be made of crockery, porcelain or the like and is preferably provided with a jacket 12 between which and the container, insulation 14 is placed so that if the contents of the container 10 are cold, they will remain cold for a period of time, or if they are hot, they will remain hot, the insulation preventing the ready transmission of heat to or from the container.

The container 10 has a wide mouth, as will be seen upon an inspection of the drawing. This is to facilitate the introduction of articles such as packages 16 of food (see Figure 5) and bottles 18 also of milk, pickles, or the like. Figure 5 shows the jug in use as a food jug with the cover removed.

To use the jug for containing liquid, however, it is undesirable to have to remove a cover from the entire mouth of the jug. I, therefore, provide a cover 20 having a liquid outlet opening 22. The cover 20 is also preferably provided with insulation 26 to prevent ready transmission of heat through the cover.

Since the jug is to be used as a liquid jug, the cover 20 must be sealed relative to the container 10, or the joint between them rendered liquid tight. This is accomplished by a gasket 28 of rubber or other resilient material. To retain the cover 20 in position on the container 10 and yet permit of its ready disconnection therefrom when desired, I provide a pair of fastening devices consisting of brackets 30, toggle levers 32 and toggle links 34. The brackets 30 may be spot-welded or otherwise secured to the jacket 12. The links 34 are provided with hook ends 36 to engage over a bead 38 of the cover 20. The toggle levers 32, when in the full line position of Figure 2, compress the gasket 28 and effectively hold the cover 20 in liquid tight position on the container 10.

By swinging each toggle lever 32 to the dotted line position of Figure 2 as shown by the arrow $a$, the cover 20 may be released for opening the entire mouth of the jug. Although I have illustrated one type of fastening means, it is obvious that any other to serve the same purpose could be substituted.

The liquid outlet opening 22 may be closed by a stopper 40 of either friction or screw type. I have shown a metal stopper having a cork sleeve 42 to provide the necessary friction to retain the stopper in closure position. A cup 44 may be provided and frictionally engaged with an annular bead 46 to cover the stopper 40 and to serve as a drinking cup when removed from the bead.

The jug may be provided with a bail 48 and handle 50 in the ordinary manner.

By arranging a readily removable cover, the jug may be opened to facilitate introduction or removal of food to or from the jug, while the removable cover having a liquid outlet provides an efficient liquid jug with a small outlet instead of the entire top being opened.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a combination food and liquid jug, a container having a substantially vertical side wall, said container being open at its upper end substantially the full diameter thereof, a casing surrounding said container and spaced therefrom, insulating material interposed between said container and said casing, a cover for said container, means to retain said cover in position on said container, said cover comprising upper and lower walls, each having a perforation therethrough, a tubular element extending through said perforations, the ends of said tubular element being flanged over said upper and lower walls to retain said element in assembled position, insulating material between the walls of said cover and said tubular element and a closure element for said tubular element.

2. In a combination food and liquid jug, a container having a substantially vertical side wall, said container being open at its upper end substantially the full diameter thereof, a cover for said container, said cover comprising upper and lower walls, said lower wall having a portion fitting the internal diameter of said container and a portion overhanging the upper edge thereof, a gasket interposed between said overhanging portion and said container, means for compressing said gasket to provide a liquid tight connection between said container and said cover, said upper and lower walls each having a perforation therein, a tubular element extending through said perforations, the ends of said tubular element being flanged over said upper and lower walls to retain said element in assembled position and a closure element for said tubular element.

3. In a combination food and liquid jug, a container having a substantially vertical side wall, said container being open at its upper end substantially the full diameter thereof, a cover for said container, means for sealing said cover with respect to the upper end of said container, said cover comprising perforated upper and lower walls, a tubular element extending through and terminating adjacent the perforations of said upper and lower walls, a closure element for said tubular element and a sleeve of cork-like material surrounding said closure element and insertable and removable therewith, said closure element having enlarged ends to retain said sleeve thereon.

JOSEPH WOODLEY.